(12) United States Patent
Gonze et al.

(10) Patent No.: US 7,810,318 B2
(45) Date of Patent: Oct. 12, 2010

(54) ELECTRICALLY HEATED PARTICULATE FILTER REGENERATION METHODS AND SYSTEMS FOR HYBRID VEHICLES

(75) Inventors: Eugene V. Gonze, Pinckney, MI (US); Michael J. Paratore, Jr., Howell, MI (US)

(73) Assignee: GM Global Technology Operations, Inc. (US)

( * ) Notice: Subject to any disclaimer, the term of this patent is extended or adjusted under 35 U.S.C. 154(b) by 790 days.

(21) Appl. No.: 11/804,665

(22) Filed: May 15, 2007

(65) Prior Publication Data

US 2008/0282674 A1    Nov. 20, 2008

(51) Int. Cl.
*F01N 3/00* (2006.01)
*F01N 3/10* (2006.01)
*F01N 3/02* (2006.01)

(52) U.S. Cl. .............................. 60/295; 60/284; 60/285; 60/286; 60/297; 60/303; 60/311

(58) Field of Classification Search .................... 60/284, 60/285, 286, 295, 303, 311, 320; 180/65.21–65.29
See application file for complete search history.

(56) References Cited

U.S. PATENT DOCUMENTS

| 4,505,107 | A | * | 3/1985 | Yamaguchi et al. ............ 60/303 |
| 4,505,726 | A |   | 3/1985 | Takeuchi |
| 4,516,993 | A |   | 5/1985 | Takeuchi |
| 4,549,398 | A | * | 10/1985 | Oishi et al. .................... 60/286 |
| 5,388,400 | A | * | 2/1995 | Hoppenstedt et al. ......... 60/274 |
| 5,785,138 | A | * | 7/1998 | Yoshida .................. 180/65.245 |
| 6,427,793 | B1 | * | 8/2002 | Hanada et al. ........... 180/65.25 |
| 2004/0139733 | A1 | * | 7/2004 | Koga et al. ..................... 60/280 |
| 2005/0115228 | A1 | * | 6/2005 | Bardon et al. .................. 60/297 |

FOREIGN PATENT DOCUMENTS

| DE | 60304322 | 12/2006 |
| DE | 102006044503 | 4/2007 |
| WO | WO 02/101208 | 12/2002 |

OTHER PUBLICATIONS

"Thermocouples," archived Jun. 6, 2003, Omega.com, pp. 1-2.*

* cited by examiner

*Primary Examiner*—Thomas E Denion
*Assistant Examiner*—Audrey Klasterka (57) ABSTRACT

A control system for controlling regeneration of a particulate filter for a hybrid vehicle is provided. The system generally includes a regeneration module that controls current to the particulate filter to initiate regeneration. An engine control module controls operation of an engine of the hybrid vehicle based on the control of the current to the particulate filter.

23 Claims, 7 Drawing Sheets

ELECTRICALLY HEATED PARTICULATE FILTER REGENERATION METHODS AND SYSTEMS FOR HYBRID VEHICLES

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to methods and systems for heating particulate filters in hybrid vehicles.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust by a particulate filter (PF) that is disposed in the exhaust stream.

Over time, the PF becomes full and the trapped diesel particulates must be removed. During regeneration, the diesel particulates are burned within the PF. Some regeneration methods ignite particulate matter present on the front of the PF via a front surface heater. Regeneration of particulate matter present inside the PF is then achieved using the heat generated by combustion of particulate matter present near the heated face of the PF or by the heated exhaust passing through the PF.

Some hybrid vehicles include diesel engines in their powertrain configuration. To maximize fuel economy, the hybrid vehicles implement a start-stop mode where the diesel engine is temporarily shut off during the drive cycle. During such time, exhaust flow through the PF ceases. A control strategy is needed to efficiently regenerate the PF.

SUMMARY

Accordingly, a control system for controlling regeneration of a particulate filter for a hybrid vehicle is provided. The system generally includes a regeneration module that controls current to the particulate filter to initiate regeneration. An engine control module controls operation of an engine of the hybrid vehicle based on the control of the current to the particulate filter.

In other features, a method of controlling regeneration of a particulate filter for hybrid vehicles is provided. The method generally includes: initiating regeneration by controlling current to the particulate filter; determining a temperature of the particulate filter; and starting an engine of the hybrid vehicle based on the temperature of the particulate filter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
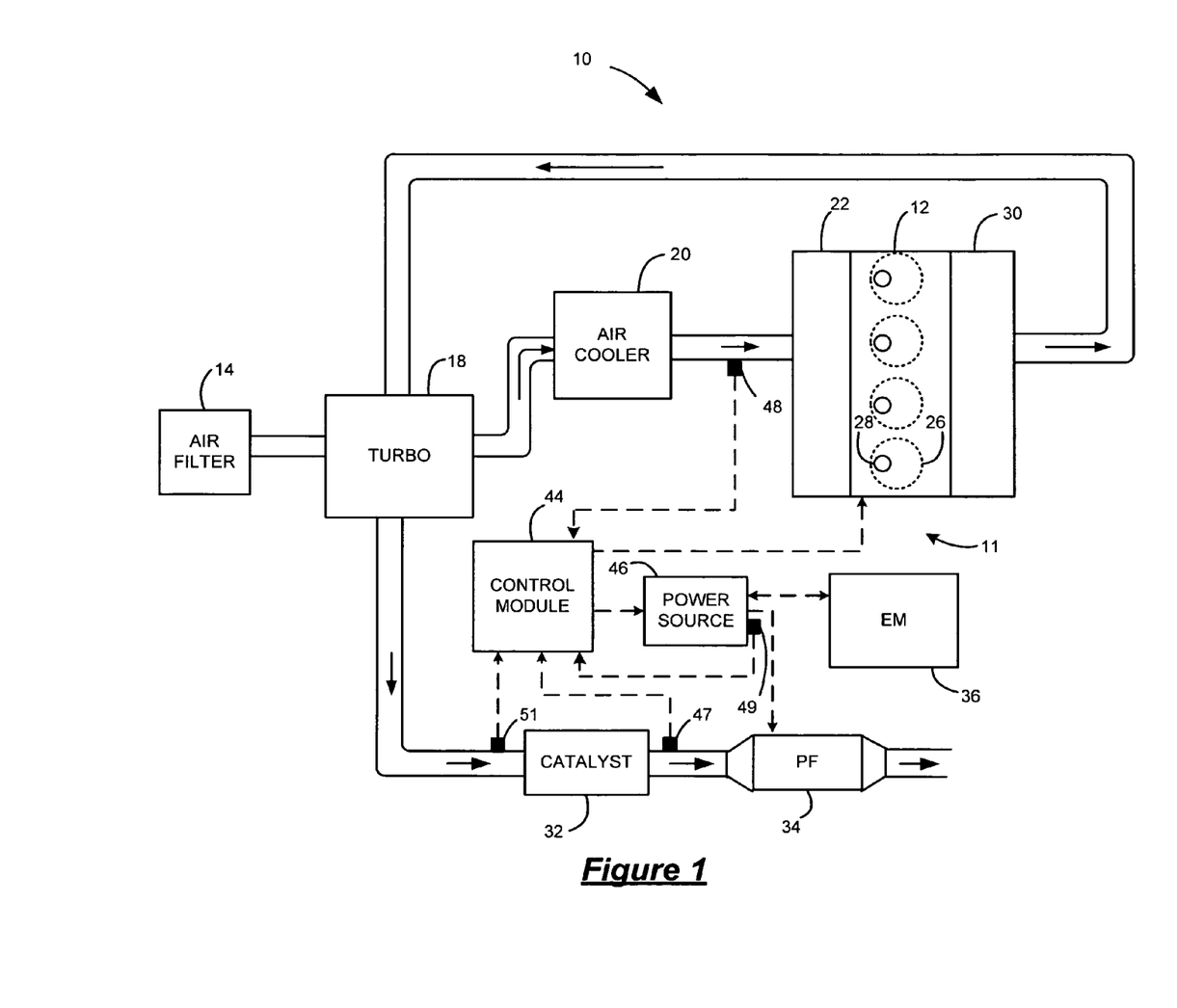
FIG. 1 is a functional block diagram of an exemplary hybrid vehicle including a particulate filter and a particulate filter regeneration system according to various aspects of the present disclosure.

Referring now to FIG. 1, an exemplary hybrid vehicle 10 including a diesel engine system 11 is illustrated in accordance with various aspects of the present disclosure. It is appreciated that the diesel engine system 11 is merely exemplary in nature and that the particulate filter regeneration system for hybrid vehicles described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system. As can be appreciated, the particulate filter regeneration methods and systems of the present disclosure can be implemented in various series and parallel hybrid vehicles. For exemplary purposes, the particulate filter regeneration methods and systems of the present disclosure will be discussed in the context of a parallel hybrid vehicle.

The hybrid vehicle 10 shown in FIG. 1 includes a turbocharged diesel engine system 11. The turbocharged diesel engine system 11 includes an engine 12 that combusts an air and fuel mixture to drive a transmission (not shown). The transmission (not shown) can be either an automatic or a manual transmission that is driven by the engine 12 through a corresponding torque converter or clutch (not shown). Air enters the system by passing through an air filter 15. Air passes through the air filter 15 and is drawn into a turbocharger 18. The turbocharger 18 compresses the fresh air entering the system 11. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 15. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any particulates present in the exhaust.

The hybrid vehicle 10 further includes an electric machine 36 and a power source 46. The electric machine 36 operates in one of a motor mode and a generator mode. When operating in the motor mode, the electric machine 36 is powered by the power source 46. When operating in the motor mode, the electric machine 36 provides positive torque which assists the engine 12 or drives the transmission (not shown). When operating in the generator mode, the electric machine 36 generates electrical energy to charge the power source 46. The electric machine 36 may be driven by the engine 12 or by the transmission (not shown). As can be appreciated, the power source 46 can power other vehicle components in addition to the electric machine 36.

A control module 44 controls the engine and PF regeneration based on various sensed and/or modeled information and the particulate filter regeneration methods and systems of the present disclosure. In various embodiments, an exhaust temperature sensor 47 generates an exhaust temperature signal based on a temperature of the exhaust. A mass airflow sensor 48 generates an exhaust air signal based on air entering or exiting the engine 12. A current and/or voltage sensor 49 generates a current and/or voltage signal based on the voltage and/or current supplied by the power source 46 to the PF 34. An oxygen sensor 51 generates an oxygen level signal based on a level of oxygen in the exhaust.

In general, the control module 44 receives the signals and estimates loading of the PF 34. When the estimated loading achieves a threshold level (e.g., 5 grams/liter of particulate matter) and the engine is turned off, current is controlled to the PF 34 via the power source 46 to initiate the regeneration process. The duration of the regeneration process varies based upon the amount of particulate matter within the PF 34. It is anticipated, that the regeneration process can last between 1-6 minutes. Current is only applied, however, during an initial portion of the regeneration process. More specifically, the electric energy heats the face of the PF 34 for a threshold period (e.g., 1-2 minutes). Once the face is sufficiently heated, the engine 12 is turned on and exhaust flowing from the engine 12 and passing through the front face is heated. The remainder of the regeneration process is achieved using the heat generated by combustion of particulate matter present near the heated face of the PF 34 or by the heated exhaust passing through the PF 34.

Figure 2:
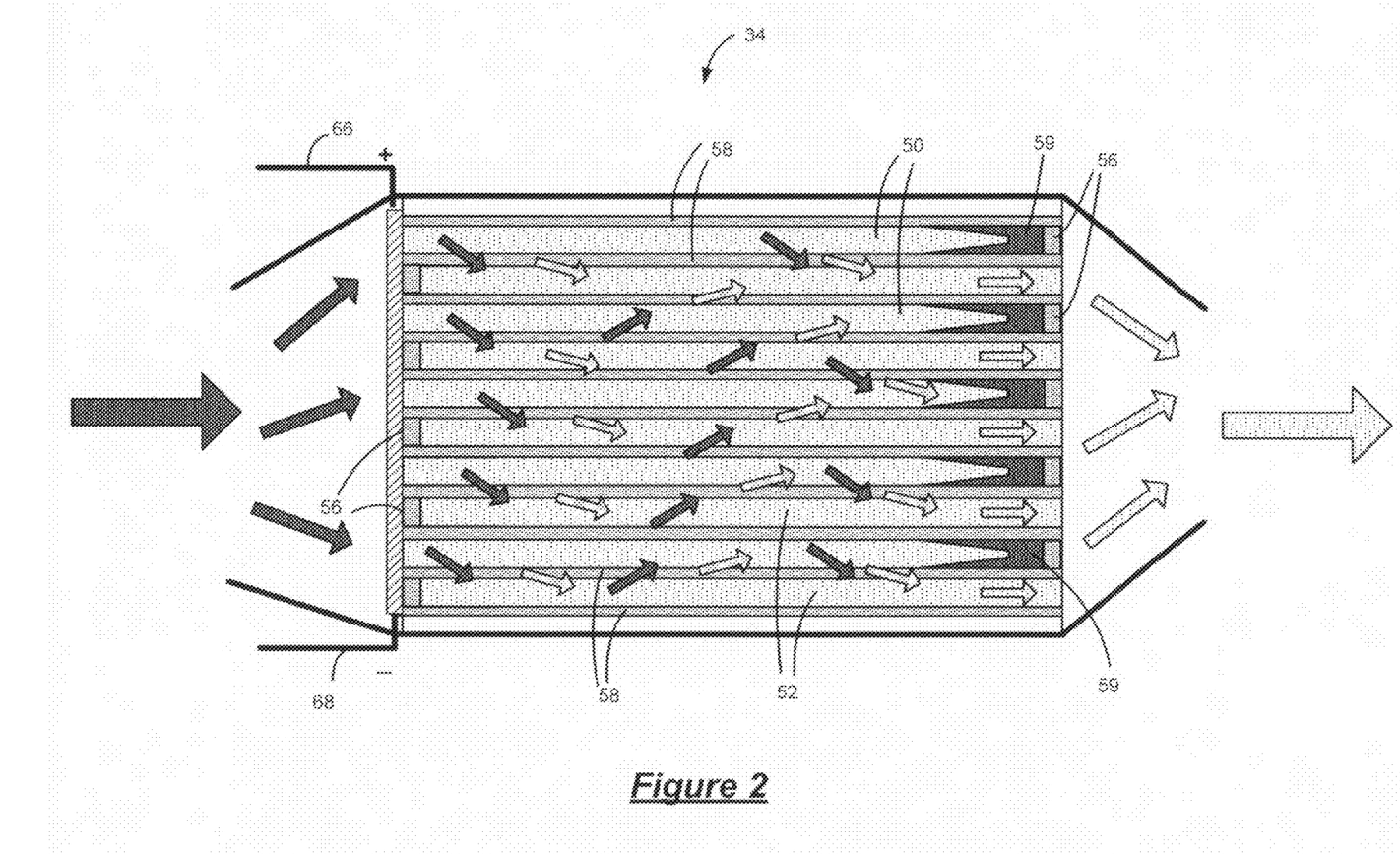
FIG. 2 is a cross-sectional view of an exemplary wall-flow monolith particulate filter.

With particular reference to FIG. 2, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present disclosure. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Particles 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid 64 is composed of electrically resistive material such as stainless steel and attached to the PF 34 using an adhesive or press fit to the PF 34.

Figure 3:
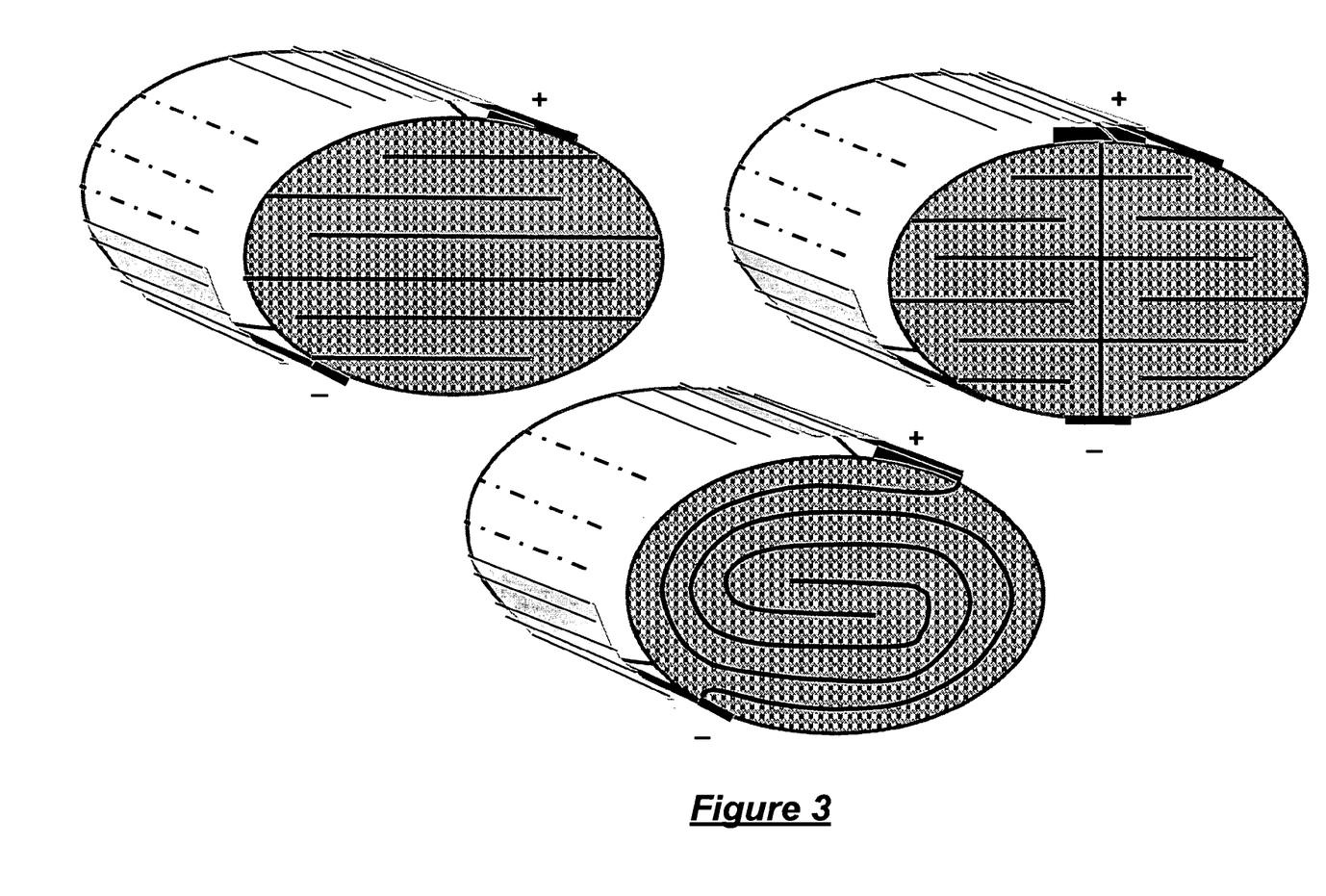
FIG. 3 includes perspective views of exemplary front faces of particulate filters illustrating various patterns of resistive paths.
Figure 4:
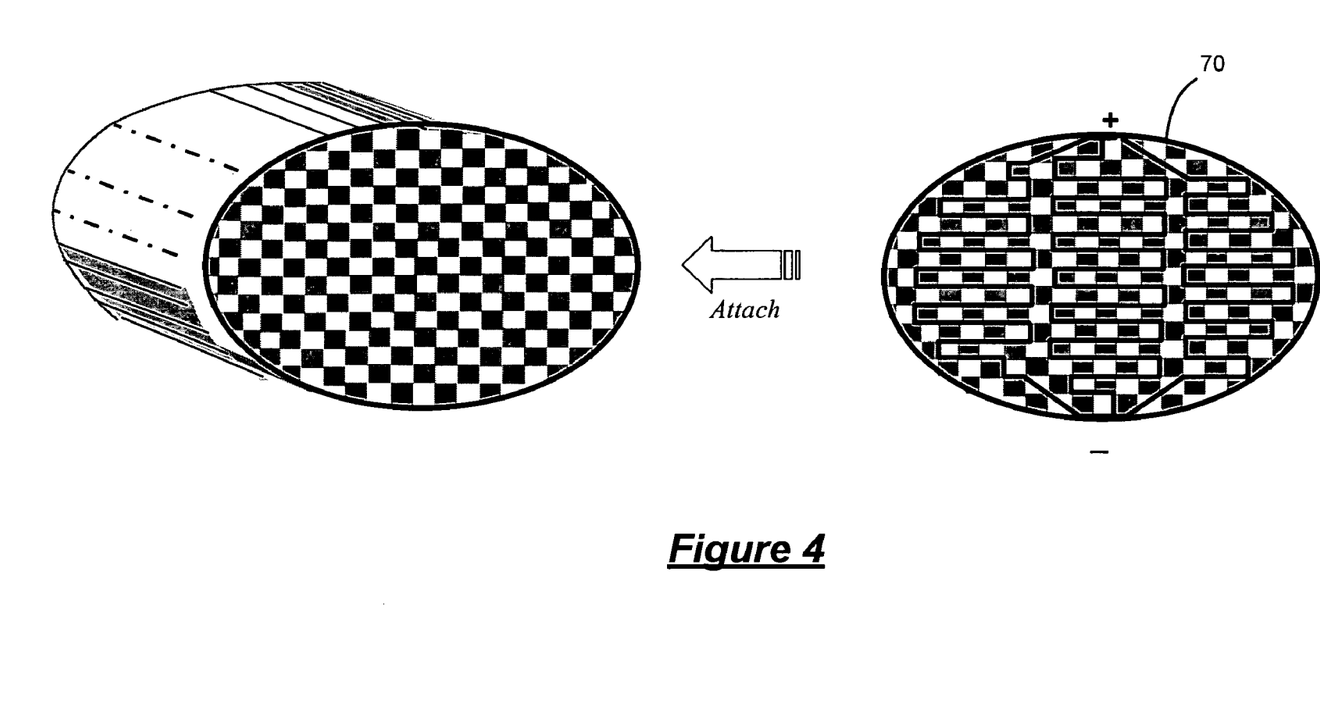
FIG. 4 is a perspective view of a front face of the exemplary particulate filter and an exemplary heater insert.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50, 52. The increased thermal energy ignites particulate matter present near the inlet of the PF 34. The heat generated from the combustion of the particulates is then directed through the PF 34 to induce combustion of the remaining particulates within the PF 34.

Figure 5:
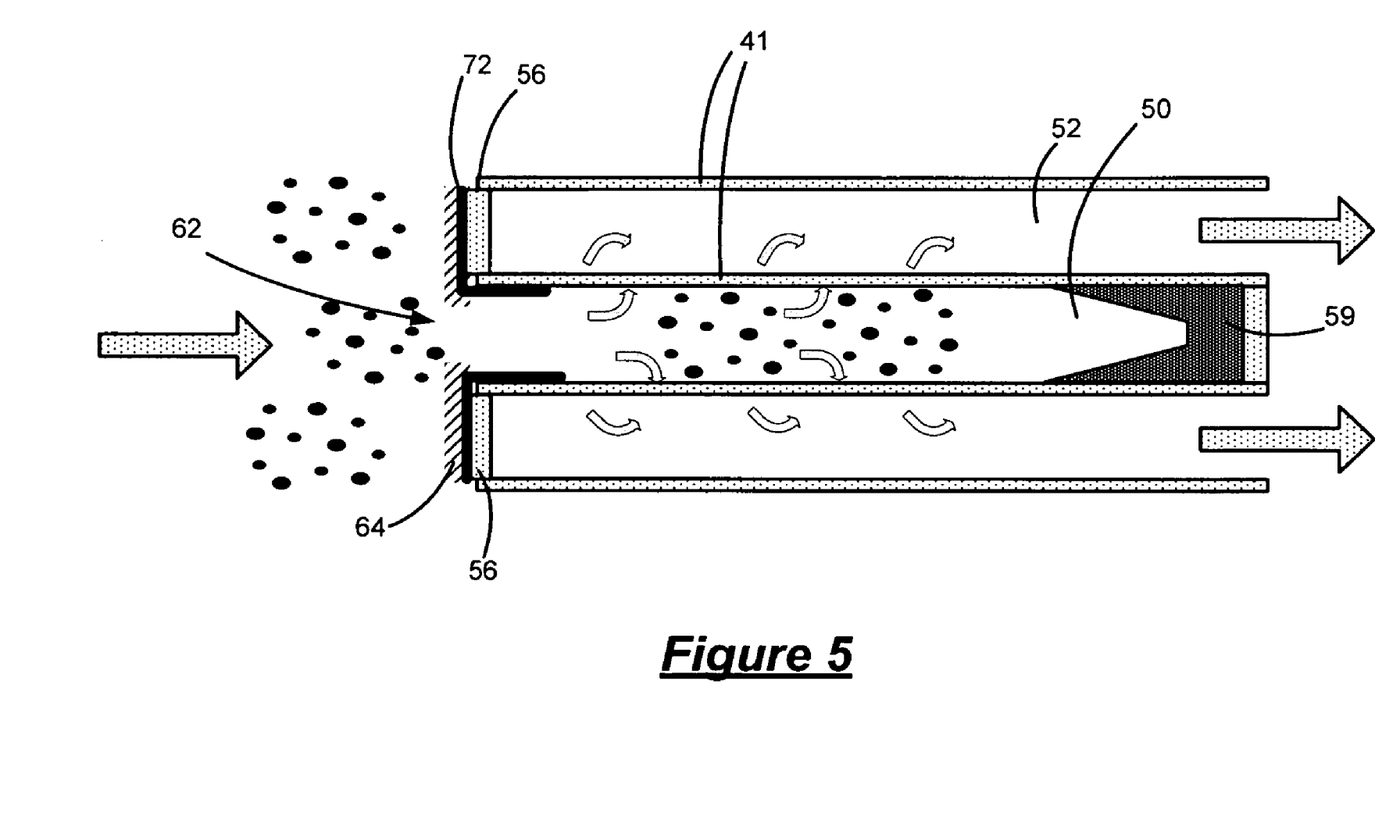
FIG. 5 is a cross-sectional view of a portion of the exemplary particulate filter of FIG. 2 including a conductive coating.

With particular reference to FIG. 5, a thermally conductive coating 72 can be additionally applied at the inlets 62 of the channels 50, 52. The coating 72 can extend a short distance down the opened ends of the closed channels 50. In various embodiments, the conductive coating extends within an inch of the front face of the PF 34. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

Figure 6:
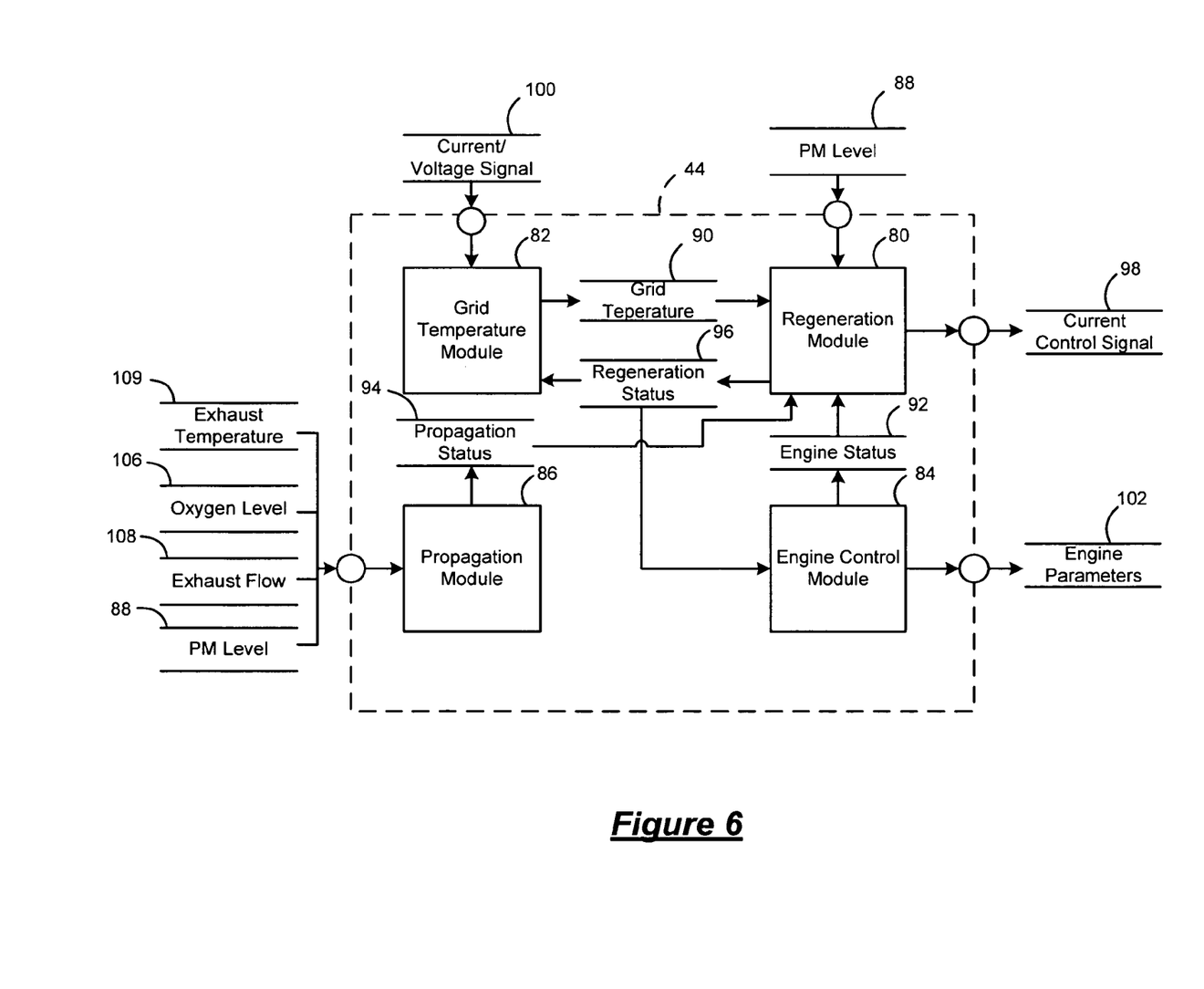
FIG. 6 is a dataflow diagram illustrating and exemplary particulate filter regeneration system for hybrid vehicles according to various aspects of the present disclosure.

Referring now to FIG. 6, a dataflow diagram illustrates various embodiments of the particulate filter regeneration system that may be embedded within the control module 44. Various embodiments of particulate filter regeneration systems according to the present disclosure may include any number of sub-modules embedded within the control module 44. As can be appreciated, the sub-modules shown in FIG. 6 may be combined and/or further partitioned to similarly control regeneration of the PF 34. Inputs to the system may be sensed from the vehicle 10 (FIG. 1), received from other control modules (not shown) within the vehicle 10 (FIG. 1), and/or determined by other sub-modules (not shown) within the control module 44. In various embodiments, the control module 44 of FIG. 6 includes a regeneration control module 80, a grid temperature determination module 82, an engine control module 84, and a propagation module 86.

The regeneration control module 80 receives as input an accumulation level of particulate matter present in the PF 34 (FIG. 1), referred to as a particulate matter level 88, a grid temperature 90, an engine status 92, and a propagation status 94. Based on the particulate matter level 88, the regeneration control module 80 determines whether regeneration is desired and sets a regeneration status 96 accordingly. Once the engine status 92 indicates that the engine 12 (FIG. 1) is OFF (as will be discussed in more detail below), the regeneration control module 80 controls current to the PF 34 (FIG. 1) via a current control signal 98 and the regeneration status 96 is set to indicate that regeneration has begun. Once the grid temperature 90 exceeds a threshold temperature, the regeneration control module 80 stops the flow of current to the PF 34 (FIG. 1) via the current control signal 98 and the regeneration status 96 is set to indicate that temperature control of the grid 64 (FIG. 2) has completed. Once the propagation status 94 indicates that regeneration is complete, the regeneration control module 80 sets the regeneration status 96 to indicate that regeneration is complete. In various embodiments, the regeneration status 96 is an enumeration with values representing, for example, 'regeneration desired,' 'regeneration begun,' 'regeneration grid temperature control complete,' and 'regeneration complete.'

The grid temperature determination module 82 receives as input a current and/or a voltage signal 100 and the regeneration status 96. Based on the current and/or the voltage signal 100 the grid temperature 90 module estimates the temperature of the grid 64 (FIG. 2) once the regeneration status 96 indicates that regeneration has begun.

The engine control module 84 receives as input the regeneration status 96. Based on the regeneration status 96, the engine control module 84 controls the engine 12 (FIG. 1) to be either ON or OFF via engine parameters 102. For example, when the regeneration status 96 indicates that the regeneration grid temperature control is complete, the engine control module 84 controls the engine 12 (FIG. 1) to be ON and in particular, controls the exhaust flow and exhaust temperature via the engine parameters 102. Based on whether the engine 12 (FIG. 1) is ON or OFF, the engine control module 84 sets the engine status 92 accordingly. For example, if the engine 12 (FIG. 1) is operating, the engine status 92 is set to TRUE. If the engine 12 (FIG. 1) is not operating, the engine status 92 is set to FALSE.

The propagation module 86 receives as input an exhaust temperature 104, the grid temperature 90, an oxygen level 106, an exhaust flow 108, and a particulate matter level 88. Based on at least one of the exhaust temperature 104, the grid temperature 90, the particulate matter level 88, and the oxygen level 106, the propagation module 86 estimates a combustion temperature of the particulate matter in the PF 34 (FIG. 1). Using the particulate matter combustion temperature and the exhaust flow 108, the propagation module 86 determines the propagation status 94 of the combustion and thus, determines whether the combustion has completed. For example, if the regeneration has completed, the propagation status 94 is set to TRUE. Otherwise, if the regeneration has not completed, the propagation status 94 is set to FALSE.

Figure 7:
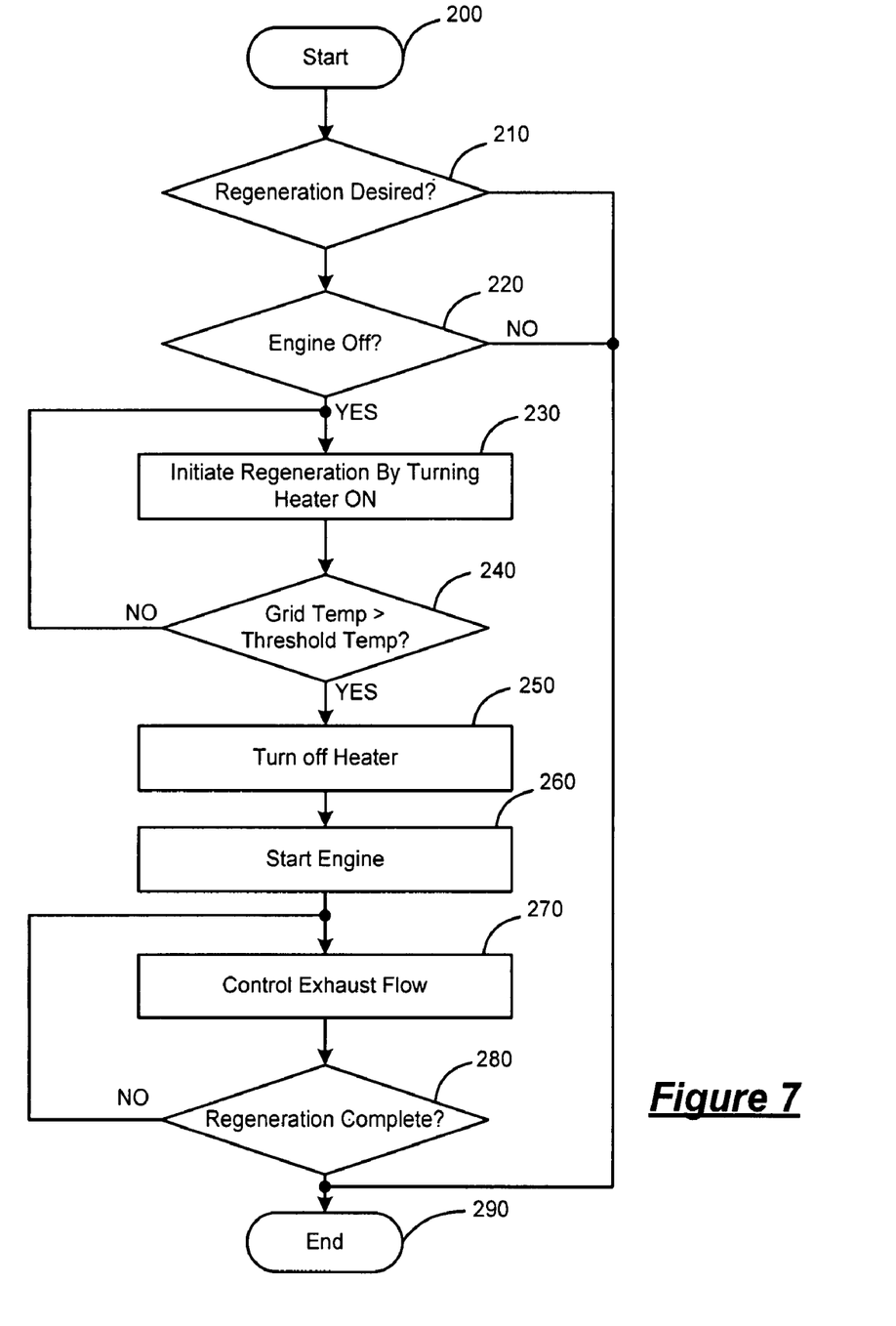
FIG. 7 is a flowchart illustrating an exemplary particulate filter regeneration method for hybrid vehicles according to various aspects of the present disclosure.

Referring now to FIG. 7, a flowchart illustrates an exemplary particulate filter regeneration method that can be performed by the particulate regeneration system of FIG. 6 in accordance with various aspects of the present disclosure. As can be appreciated, the order of execution of the steps of the exemplary particulate filter regeneration method can vary without altering the spirit of the method. The exemplary particulate filter regeneration method may be performed periodically during control module operation or scheduled to run based on certain events.

In one example, the method may begin at 200. The need for regeneration is evaluated at 210. If regeneration is desired at 210, the engine status 92 is evaluated at 220. Otherwise, if regeneration is not desired at 210, the method may end at 290.

If the engine status 92 indicates that the engine 12 (FIG. 1) is OFF at 220, current is controlled to the PF 34 (FIG. 1) to initiate combustion of the particulate matter present near the face of the PF 34 (FIG. 1) at 230. Otherwise, if the engine 12 (FIG. 1) is ON at 220, the method may end at 290.

Once current is controlled to the PF 34 (FIG. 1) at 230, the grid temperature 90 is monitored at 240. In various embodiments, the grid temperature 90 is estimated as discussed above. If the grid temperature 90 exceeds a predetermined threshold at 240, current to the PF 34 is turned off at 250 and the engine 12 (FIG. 1) is started at 260. While the engine 12 (FIG. 1) is operating, the exhaust flow is controlled at 270 until regeneration is complete at 280. Thereafter, the method may end at 290.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for controlling regeneration of a particulate filter for a hybrid vehicle, comprising:
    a regeneration module that controls current to the particulate filter to initiate regeneration; and
    an engine control module that starts an engine of the hybrid vehicle based on the control of the current to the particulate filter.

2. The system of claim 1 wherein the engine control module starts the engine when the regeneration has begun.

3. The system of claim 1 wherein the engine control module controls a flow of exhaust from the engine during the regeneration.

4. The system of claim 1 further comprising a temperature module that estimates a temperature of the particulate filter and wherein the regeneration module controls the current to the particulate filter based on the temperature of the particulate filter.

5. The system of claim 4 wherein the temperature module estimates the temperature of a resistive grid of the particulate filter.

6. The system of claim 5 wherein the temperature module estimates the temperature of the resistive grid based on at least one of the current and a voltage supplied to the particulate filter.

7. The system of claim 1 further comprising a propagation module that estimates a propagation status of combustion of particulate matter in the particulate filter and wherein the regeneration module determines that the regeneration is complete based on the propagation status.

8. The system of claim 7 wherein the propagation module estimates a propagation status based on a temperature of the combustion and a flow of exhaust.

9. The system of claim 8 wherein the propagation module estimates the temperature of the combustion based on at least one of a temperature of the particulate filter, a temperature of the exhaust, a level of oxygen in the exhaust, and a level of the particulate matter in the particulate filter.

10. A method of controlling regeneration of a particulate filter for hybrid vehicles, comprising:
    initiating regeneration by controlling current to the particulate filter;
    determining a temperature of the particulate filter; and
    starting an engine of the hybrid vehicle based on the temperature of the particulate filter.

11. The method of claim 10 further comprising controlling a flow of exhaust from the engine such that combustion of particulate matter is not extinguished.

12. The method of claim 10 further comprising determining whether the regeneration is desired based on a level of particulate matter in the particulate filter.

13. The method of claim 10 wherein the estimating the temperature of the particulate filter further comprises estimating a temperature of a resistive grid of the particulate filter based on at least one of the current and a voltage supplied to the particulate filter.

14. The method of claim 10 further comprising controlling a flow of exhaust from the engine to propagate combustion of particulate matter through the particulate filter.

15. The method of claim 14 further comprising estimating a propagation status based on a temperature of the combustion of the particulate matter and the flow of exhaust and wherein the controlling the flow of exhaust is based on the propagation status.

16. The method of claim 15 further comprising estimating the temperature of the combustion of the particulate matter based on at least one of a level of the particulate matter in the particulate filter, a temperature of the exhaust, an oxygen level in the exhaust, and a temperature of the particulate filter.

17. A hybrid vehicle, comprising:
   a particulate filter that filters particulate matter from engine exhaust wherein an upstream end of the particulate filter receives the engine exhaust;
   a grid of electrically resistive material that is applied to an exterior upstream surface of the particulate filter and that selectively heats exhaust passing through the grid to initiate combustion of the particulate matter within the particulate filter; and
   a control module that initiates regeneration by controlling current to the grid, that determines a temperature of the grid, and that starts an engine of the hybrid vehicle based on the temperature of the grid.

18. The hybrid vehicle of claim 17 wherein the control module controls a flow of the engine exhaust such that the combustion of the particulate matter is not extinguished.

19. The hybrid vehicle of claim 17 wherein the control module determines whether the regeneration is desired based on a level of the particulate matter in the particulate filter.

20. The hybrid vehicle of claim 17 wherein the control module estimates the temperature of the grid based on at least one of the current and a voltage supplied to the particulate filter.

21. The hybrid vehicle of claim 17 wherein the control module controls a flow of the engine exhaust to propagate the combustion of the particulate matter through the particulate filter.

22. The hybrid vehicle of claim 21 wherein the control module estimates a propagation status based on a temperature of the combustion of the particulate matter and the flow of engine exhaust and wherein the control module controls the flow of engine exhaust based on the propagation status.

23. The hybrid vehicle of claim 22 wherein the control module estimates the temperature of the combustion of the particulate matter based on at least one of a level of the particulate matter in the particulate filter, a temperature of the engine exhaust, an oxygen level in the engine exhaust, and the temperature of the grid.

* * * * *